(12) United States Patent
Plotke

(10) Patent No.: US 8,451,174 B1
(45) Date of Patent: May 28, 2013

(54) BEAM-SCANNING SYSTEM

(75) Inventor: Leonard Alan Plotke, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 13/011,354

(22) Filed: Jan. 21, 2011

Related U.S. Application Data

(63) Continuation-in-part of application No. 12/880,370, filed on Sep. 13, 2010.

(51) Int. Cl.
*G01S 3/02* (2006.01)

(52) U.S. Cl.
USPC .......................................................... 342/450

(58) Field of Classification Search
USPC .......................................................... 342/450
See application file for complete search history.

(56) References Cited

U.S. PATENT DOCUMENTS

| 4,173,017 | A | * | 10/1979 | Burlage et al. ................. 342/162 |
|---|---|---|---|---|
| 4,253,670 | A | | 3/1981 | Moulton et al. |
| 4,866,438 | A | | 9/1989 | Knisch |
| 5,734,337 | A | | 3/1998 | Kupersmit |
| 6,205,231 | B1 | | 3/2001 | Isadore-Barreca et al. |
| 6,222,492 | B1 | * | 4/2001 | Mahon ........................... 343/786 |
| 6,266,442 | B1 | | 7/2001 | Laumeyer et al. |
| 6,363,161 | B2 | | 3/2002 | Laumeyer et al. |
| 6,449,384 | B2 | | 9/2002 | Laumeyer et al. |
| 7,552,008 | B2 | | 6/2009 | Newstrom et al. |
| 7,623,248 | B2 | | 11/2009 | Laflamme |
| 8,160,452 | B1 | * | 4/2012 | Tidwell et al. ................ 398/140 |
| 8,294,595 | B1 | | 10/2012 | Plotke |
| 2001/0011957 | A1 | | 8/2001 | Mitchell et al. |
| 2002/0106109 | A1 | | 8/2002 | Retterath et al. |
| 2002/0113872 | A1 | | 8/2002 | Kinjo |
| 2002/0167445 | A1 | * | 11/2002 | Eden ............................. 342/451 |
| 2005/0119030 | A1 | | 6/2005 | Bauchot et al. |
| 2006/0002590 | A1 | | 1/2006 | Borak |
| 2006/0055521 | A1 | | 3/2006 | Blanco et al. |
| 2008/0122693 | A1 | * | 5/2008 | Needham et al. ............. 342/368 |
| 2009/0310664 | A1 | * | 12/2009 | Yannone ....................... 375/228 |
| 2010/0172543 | A1 | | 7/2010 | Winkler |
| 2010/0207738 | A1 | * | 8/2010 | Bloy ............................. 340/10.3 |
| 2010/0219953 | A1 | * | 9/2010 | Bloy ........................... 340/572.1 |

OTHER PUBLICATIONS

U.S. Appl. No. 12/563,414, filed Sep. 21, 2009 by Plotke et al.
U.S. Office Action dated Feb. 15, 2012 in U.S. Appl. No. 12/563,414.
U.S. Notice of Allowance dated May 21, 2012 in U.S. Appl. No. 12/563,414.

* cited by examiner

*Primary Examiner* — Harry Liu
(74) *Attorney, Agent, or Firm* — Hope Baldauff, LLC

(57) ABSTRACT

Technologies are described herein for locating and tracking objects of interest within a field of regard (FOR). Aspects include using a phased array to scan the FOR and receive signals emitted from an object of interest. The object of interest may then be located and tracked by processing the signals emitted from the object of interest.

15 Claims, 22 Drawing Sheets

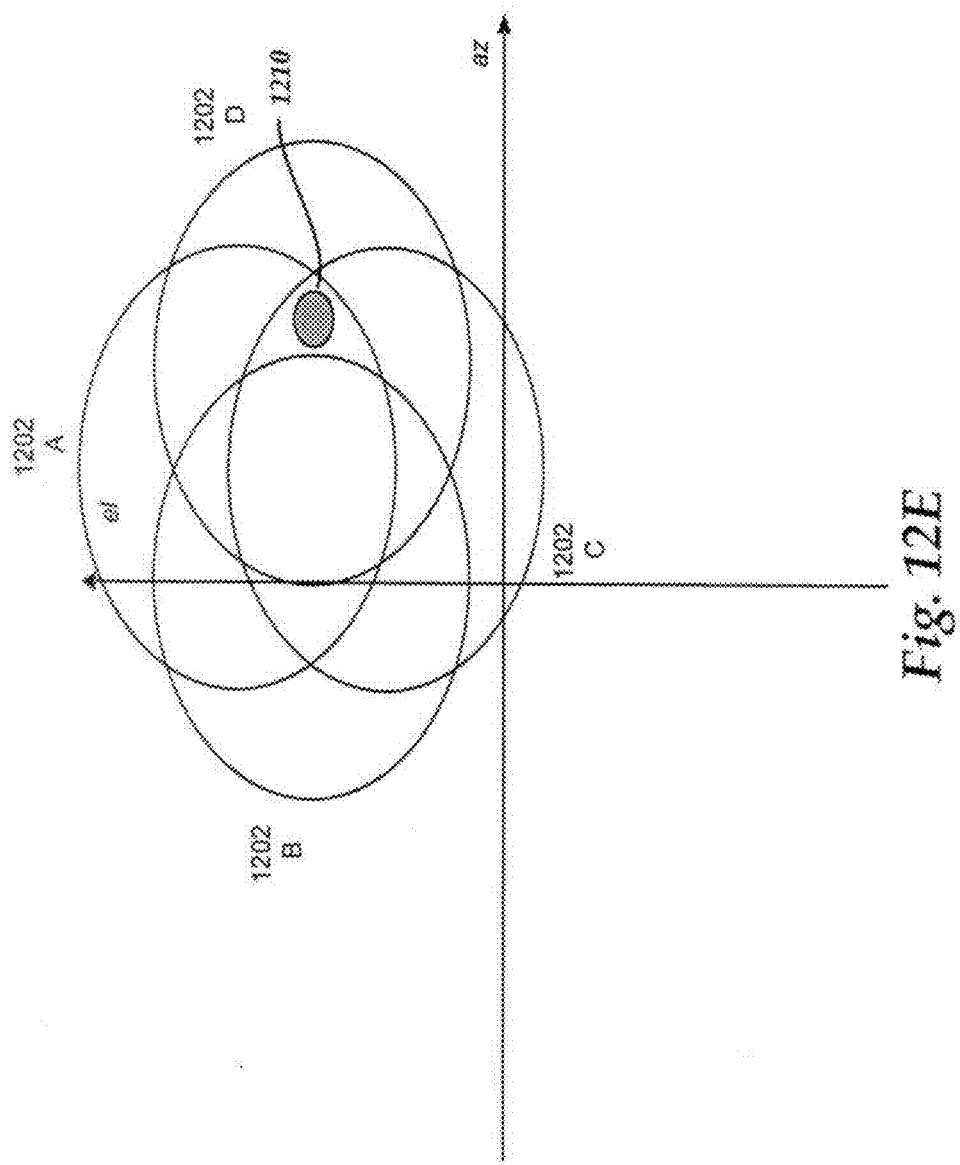

US 8,451,174 B1

BEAM-SCANNING SYSTEM

CROSS-REFERENCE TO RELATED APPLICATIONS

This patent application is a continuation-in-part patent application of U.S. patent application Ser. No. 12/880,370 entitled "Object Detection and Location System," filed Sep. 13, 2010, which is incorporated herein by reference in its entirety.

BACKGROUND

Often, individuals and organizations desire to find the location of one or more objects of interest within a field of regard. These objects of interest may include individuals, vehicles, equipment or the like. Upon determining the location of these objects of interest, tracking of the objects of interest within the field of regard may be desired.

Some techniques for locating and tracking objects of interest include using one or more dipole antennae or one or more parabolic reflector-antennae. Dipole antennae are omni-directional and pick up signals from all directions. Accordingly, it can be difficult for a system using dipole antennae to distinguish signals coming from one object of interest from signals coming from another object of interest. Although parabolic reflector antennae are unidirectional, they cannot locate, detect, listen to and track multiple objects of interest while simultaneously scanning for other objects of interest without the addition of an additional parabolic reflector antenna for each object of interest.

There is a need for a location and tracking system that provides for simultaneous tracking of multiple objects of interest, with the flexibility and practicality of using dipole antennas. It is with respect to these considerations and others that the disclosure made herein is presented.

SUMMARY

Technologies are described herein for utilizing a beam-scanning system. Through the utilization of the technologies and concepts presented herein, objects of interest may be detected, located, listened to and tracked within a field of regard (FOR). The beam-scanning system may use a phased array to receive a radio frequency (RF) signal emitted by an object of interest. Upon receiving the RF signal from the object of interest, the beam-scanning system processes the received signal to determine a location and direction of the object of interest. Upon determining the location and direction of the object of interest, the beam-scanning system may track the object of interest within a field of regard simultaneously with the location and direction of other objects of interest within the FOR. The location, direction and tracking information generated by the beam-scanning system may be transmitted to an external system for further processing and use.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 12E is a diagram illustrating a 4-beam arrangement utilizing a scan pattern to detect an object of interest, in accordance with some embodiments;

DETAILED DESCRIPTION

Figure 1:
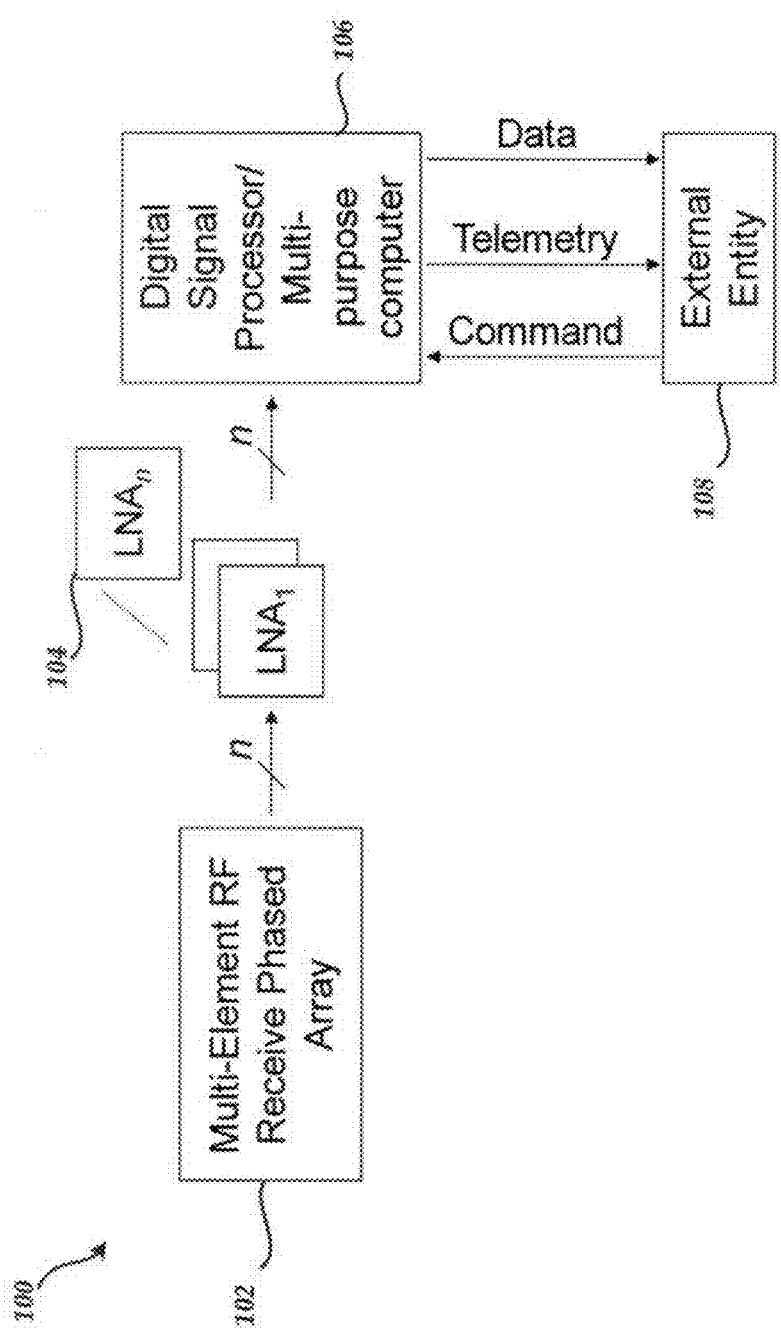
FIG. 1 is a system architecture diagram illustrating a beam-scanning system, in accordance with some embodiments.

Technologies are described herein for locating and tracking objects of interest using a beam-scanning system. Through the utilization of the technologies and concepts presented herein, the beam-scanning system may locate and track one or more objects of interest by radio frequency (RF) signals emitted by the one or more objects of interest, simultaneously. The beam-scanning system may acquire the RF signals using an RF receive phased array. By locating and tracking objects of interest, operations may be coordinated based on the movement of one or more objects of interest.

In the following detailed description, references are made to the accompanying drawings that form a part hereof, and which are shown by way of illustration, specific embodiments, or examples. Referring now to the drawings, in which like numerals represent like elements through the several figures, a beam-scanning system according to the various embodiments will be described.

FIG. 1 is a system architecture diagram illustrating a beam-scanning system 100. The beam-scanning system 100 includes a multi-element RF phased array 102. The phased array 102 may include one or more RF signal receiving elements within the phased array 102 arranged in a circular pattern, or a pattern similar to a circle, for example, a hexagon. The number of RF signal receiving elements for the phased array 102 may vary. For example, the phased array 102 may contain 7, 19, 37, 61, 91, 127, etc. RF receiving elements. The phased array 102 receives RF signals emitted by an object of interest in a field of regard (FOR).

Once the phased array 102 receives an RF signal emitted from the object of interest, the received RF signal is amplified. Each RF signal receiving element is connected to a low noise amplifier 104 for RF signal amplification. Each RF signal amplified by a low noise amplifier 104 is transmitted to a digital signal processor (DSP) 106 for signal processing. The DSP 106 is used to adjust the received RF signal and adjust the receive gain of each RF signal receiving element in order to create and scan highly directive receive beams received from the object of interest. The DSP 106 also processes the received RF signal to perform a location and direction determination, adjust a frequency band pass, and calibrate the phased array 102. Once the DSP 106 processes the received RF signal, the DSP 106 transmits the processed data to an external entity 108 for further processing and review. For example, the external entity 108 may be a military organization, which could use the processed data to detect, locate and track enemy movements or the movement of the military organization's own troops and equipment. The external entity 108 may communicate with the DSP 106 using one or more command lines to request telemetry information and data from the DSP 106, which can be sent to the external entity 108 via one or more telemetry lines and one or more data lines.

Figure 2:
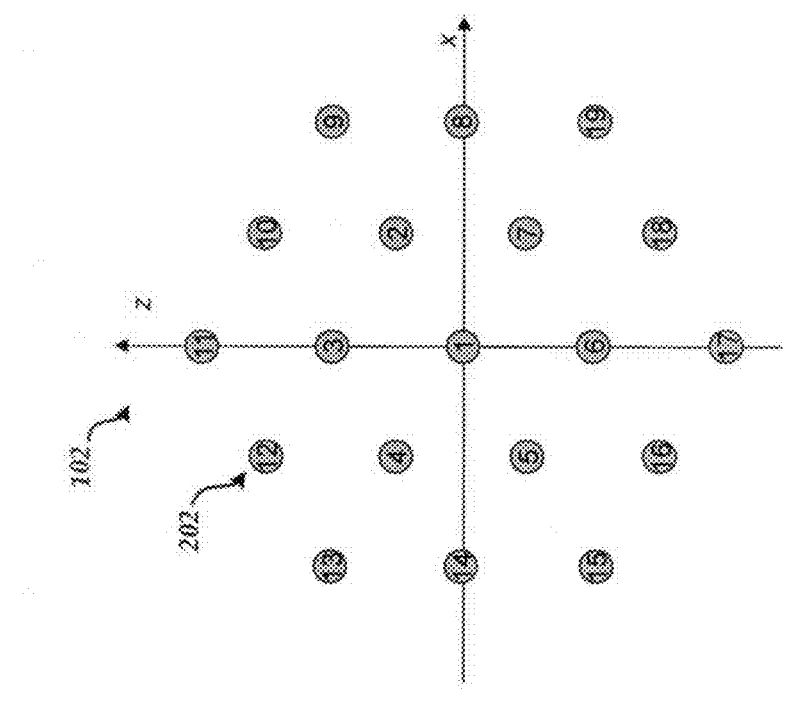
FIG. 2 is a phased array for use with the beam-scanning system, in accordance with some embodiments.

Referring now to FIG. 2, the phased array 102 of the beam-scanning system 100 is now illustrated. The phased array 102 includes one or more RF signal receiving elements 202. The phased array 102 may be arranged in a pattern resembling a circle, for example, a hexagon. For example, a 19-element phased array 102 may be arranged in a hexagonal pattern oriented in an x-z plane looking outward along the positive y-axis toward the direction of potential objects of interest. The phased array 102 could be smaller or larger simply by following the same pattern. The one or more RF signal receiving elements 202 may be phased together to aggregate any RF signals received.

Figure 3:
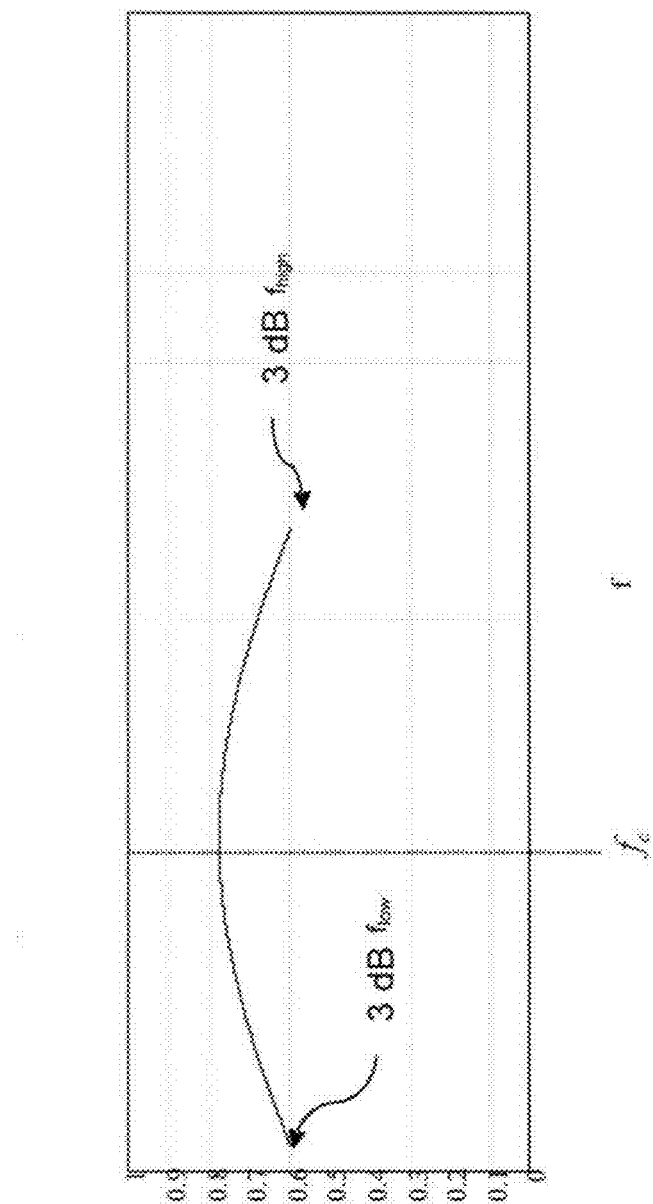
FIG. 3 is a graph illustrating a responsivity of an RF signal receiving element normalized to 1 as a function of RF frequency, in accordance with some embodiments.

Each RF signal receiving element 202 may be an RF dipole antenna having a responsivity normalized to one as a function of RF frequency as illustrated in FIG. 3. A frequency response transfer function or responsivity, R, for the RF signal receiving element 202 may be of the form of a band-pass filter such as:

$$R(f, \theta) = \frac{j \cdot \frac{f}{f_{low}}}{\left(j \cdot \frac{f}{f_{high}} + 1\right) \cdot \left(j \cdot \frac{f}{f_{low}} + 1\right)} \cdot \cos\theta$$

where, $f_{low}$ and $f_{high}$ are low and high frequency 3-dB cutoffs, respectively, and correspond to the lowest and highest RF frequencies that a dipole antenna element may be capable of receiving/transmitting. The low and high frequency 3-dB cutoffs may be adjusted to better correlate to the RF frequencies being emitted by the one or more objects of interest. In addition, $j=\sqrt{-1}$ is an imaginary number used in a mathematical model associated with an RF filter. An operational center frequency, $f_c$, depends on an RF band emitted by the object of interest.

Figure 4:
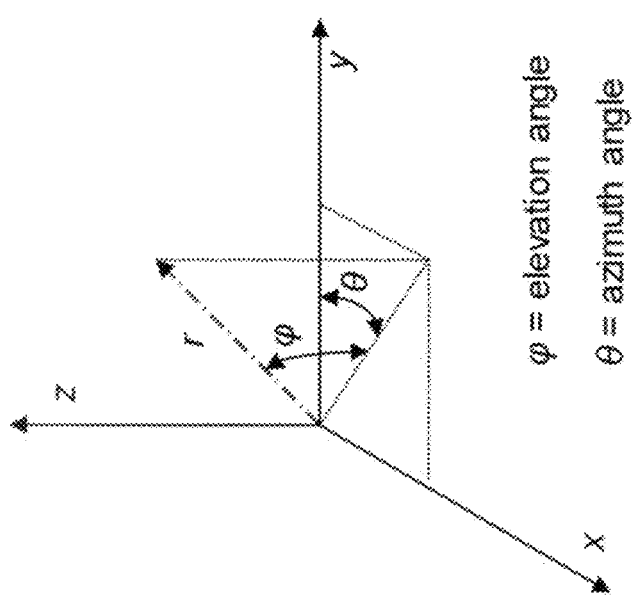
FIG. 4 is a diagram of a beam-scanning system coordinate system illustrating azimuth angle and elevation angle with respect to the coordinate axes, in accordance with some embodiments.
Figure 5:
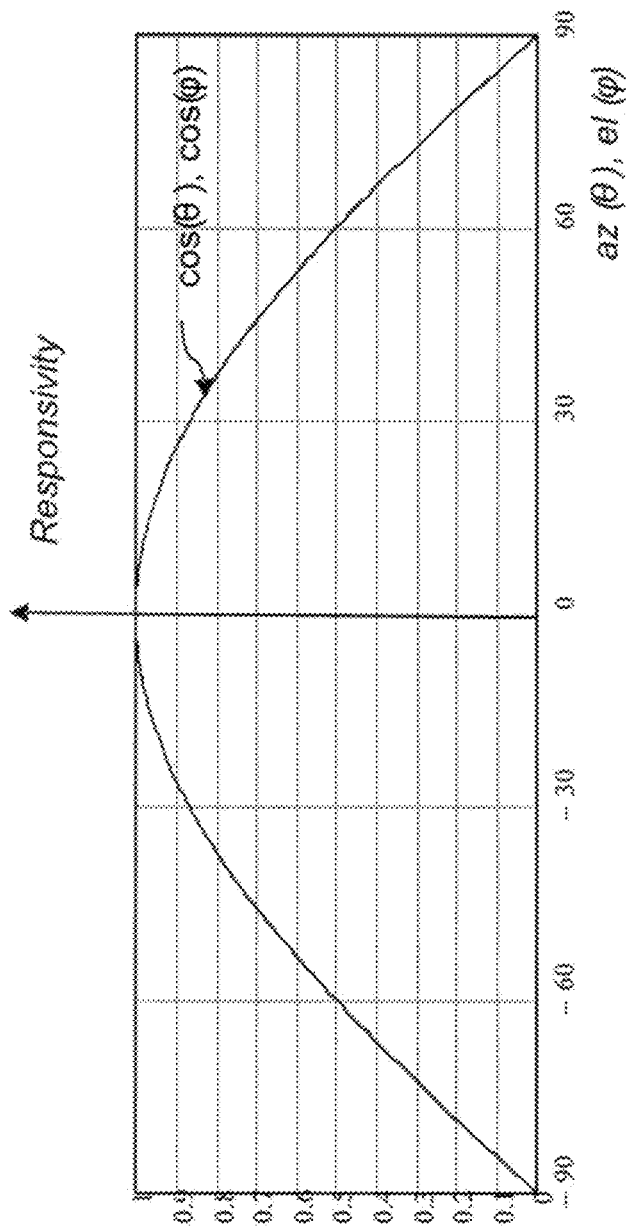
FIG. 5 is a graph illustrating a responsivity of an RF receiving element normalized to 1 as a cosine function of an azimuth angle and an elevation angle, in accordance with some embodiments.

The responsivity of each RF signal receiving element 202 is also a function of an azimuth angle, $\theta$, and an elevation angle, $\phi$, from a line-of-sight as illustrated in FIG. 4. As the angle from the line-of-sight varies from 0° to ±90°, the normalized responsivity of an RF signal receiving element 202 typically varies from 1 to 0 in the form of a cosine function as shown in FIG. 5. The responsivity of each RF signal receiving element 202 is assumed to be uniform in both the azimuth and elevation angles as illustrated in FIG. 5.

Figure 6:
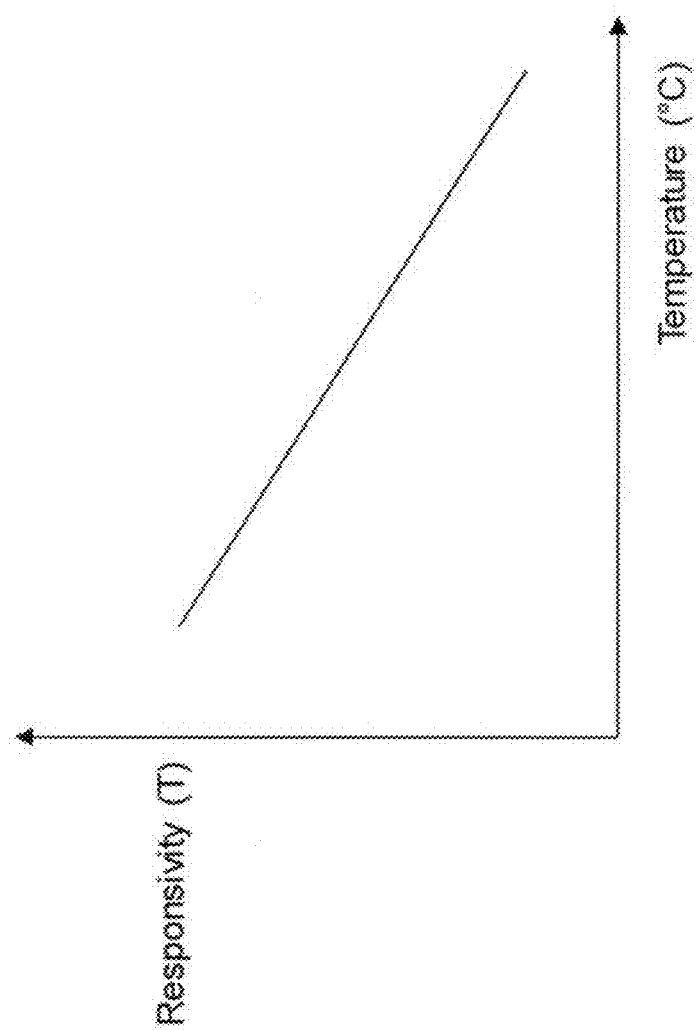
FIG. 6 is a graph illustrating a responsivity of an RF receiving element as a function of temperature, in accordance with some embodiments.

In addition, the responsivity of the RF signal receiving element 202 may vary as a function of temperature as illustrated in FIG. 6. The responsivity of the RF signal receiving element 202 tends to improve at low temperatures. In addition, the signal-to-noise ratio for the RF signal receiving element 202 improves due to lower electronic thermal noise.

Values for the location of the RF signal receiving elements 202 in x and z axes are normalized to 1 and are not representative of the physical distances the RF receiving elements 202 are from the origin. Rather, the distance between the $i_{th}$ RF signal receiving element 202 of the RF signal receiving elements 202 and a neighboring RF signal receiving element 202 may be less than approximately one-half the wavelength, $\lambda$, of the highest frequency, f. The equation for the wavelength of a RF wave is, $$\lambda = \frac{c}{f}$$

where c is the speed of light. The separation of each RF signal receiving element 202 is minimized in order to avoid side-lobes in the array pattern as a function of both $\theta$ and $\phi$.

An RF receive beam (B) having a beam center pointed at angles $\Delta\theta$ and $\Delta\phi$ from the y-axis may be modeled using the following set of calculations:

$$B(\theta, \varphi) = \left| \sum_{i=1}^{n} R(f_c, \theta) \cdot e^{j \cdot k_c \cdot x_i \cdot d_x \cdot [\sin(\theta) \cdot \cos(\varphi) - \sin(\Delta\theta) \cdot \cos(\Delta\varphi)]} \cdot R(f_c, \varphi) \cdot e^{j \cdot k_c \cdot z_i \cdot d_z \cdot [\sin(\varphi) - \sin(\Delta\varphi)]} \right|$$

where a wave number at the center frequency, $k_c$, is found by the equation, $$k_c = \frac{2 \cdot \pi}{\lambda_c}$$

and where $d_x$ multiplied by $x_i$ is the distance of the $i_{th}$ RF signal receiving element 202 from the z-axis, and $d_z$ multiplied by $z_i$ is the distance of the $i_{th}$ RF signal receiving element 202 from the x-axis where $x_i$ and $z_i$ are defined in the table below for a 19-element hexagonal pattern which can be extended for any number of n-elements.

| i | $z_i$ | $x_i$ |
|---|---|---|
| 1 | 0 | 0 |
| 2 | 0.5 | 0.866 |
| 3 | 1 | 0 |
| 4 | 0.5 | −0.866 |
| 5 | −0.5 | −0.866 |
| 6 | −1 | 0 |
| 7 | −0.5 | 0.866 |
| 8 | 0 | 2*.866 |
| 9 | 1 | 2*.866 |
| 10 | 1.5 | 0.866 |
| 11 | 2 | 0 |
| 12 | 1.5 | −0.866 |
| 13 | 1 | −1.732 |
| 14 | 0 | −1.732 |
| 15 | −1 | −1.732 |
| 16 | −1.5 | −0.866 |
| 17 | −2 | 0 |
| 18 | −1.5 | 0.866 |
| 19 | −1 | 2*.866 |
| ... | ... | ... |

Figure 7:
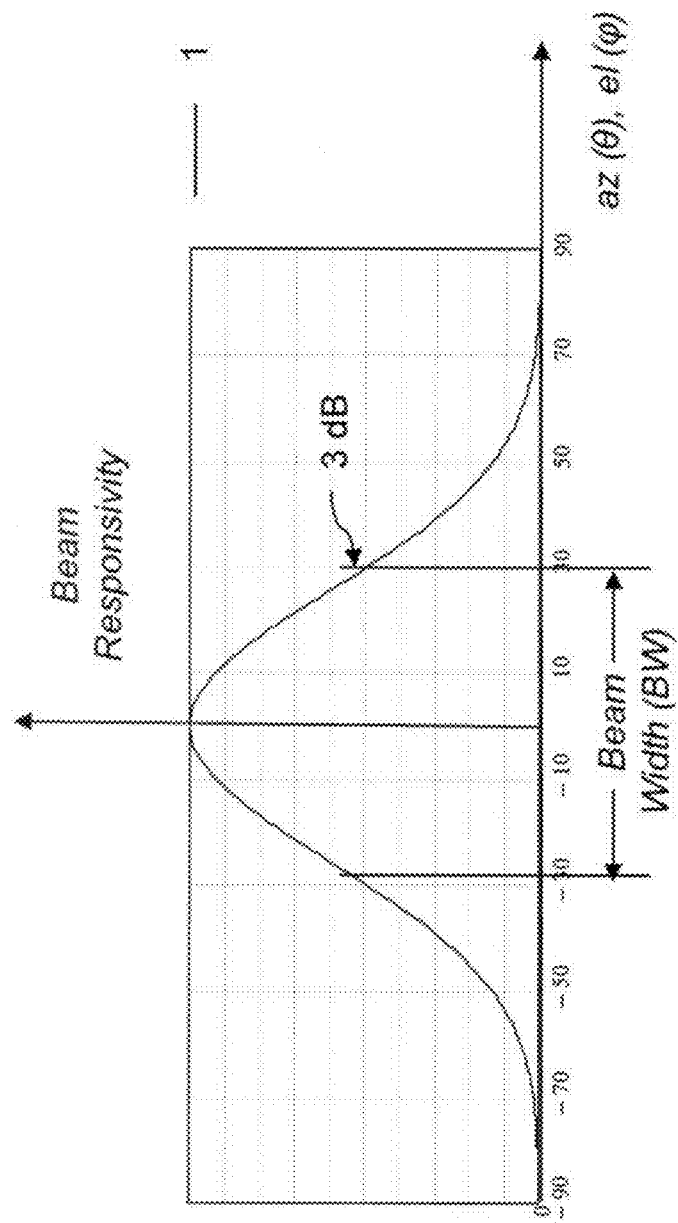
FIG. 7 is a graph illustrating a responsivity of a plurality of RF receiving elements formed into a beam used by the beam-scanning system as a function of an azimuth angle and an elevation angle ranging from 0 to 90 degrees, in accordance with some embodiments.

An assumption may be made that the responsivity of an RF signal receive element is omni-directional and therefore $R(f_c, \phi)$ is approximately equal to $R(f_c, \theta)$. A single RF receive beam has a responsivity $B(\theta, \phi)$ over azimuth and elevation angles ranging from 0° to ±90° as illustrated in FIG. 7.

A three decibel (3 db) half power point for the RF receive beam may be defined as:

$$B_{3-dB} = \frac{\text{real}[B(\Delta\theta, \Delta\varphi)]}{2}$$

A beam width, BW, of the RF receive beam is defined to be equal to the diametrical angular distance between two 3-dB points. The beam width is approximately equal to the diameter of the phased array 102 divided by the wavelength as illustrated in FIG. 7.

Figure 8:
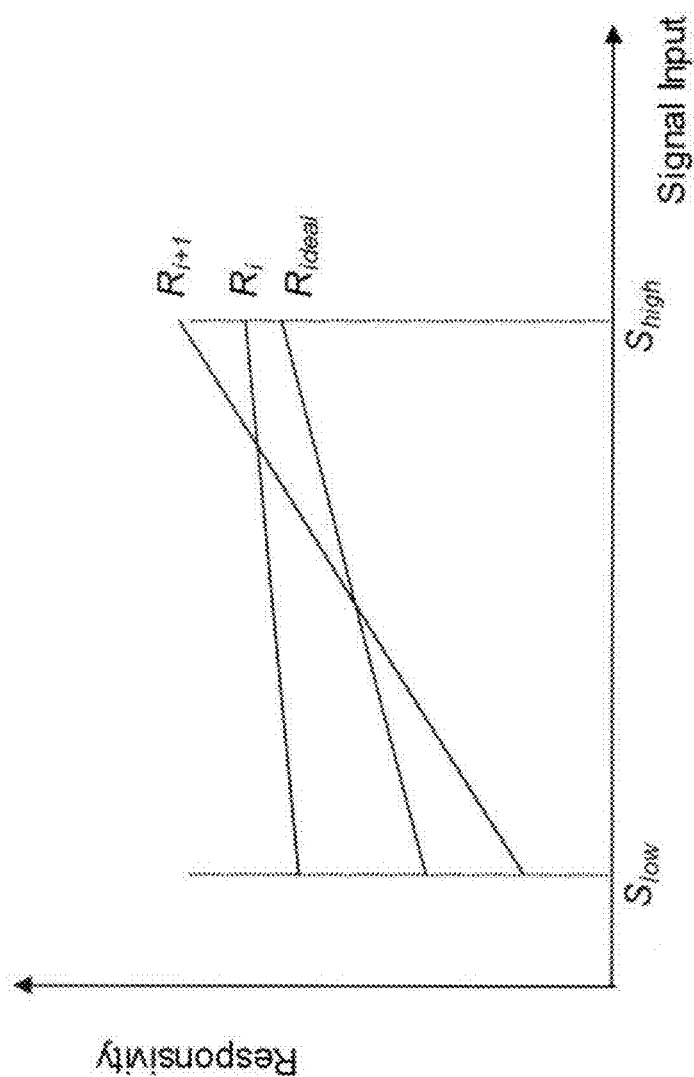
FIG. 8 is a graph illustrating a responsivity of an RF receiving element as a function of received input signal, in accordance with some embodiments.

Since the responsivity of each RF signal receiving element 202 is assumed to vary as a function of frequency, angle from the line-of-sight, temperature, and receive signal (S) input as illustrated in FIG. 8, it is necessary to electronically calibrate and adjust the gain and level of the output of each RF signal receiving element 202. This calibration is conducted in order to make the responsivities of the RF signal receiving elements 202 uniform and thereby optimize the beam-forming capability of the beam-scanning system 100. A calibration algorithm that may be used to adjust the gain and level to an ideal responsivity, $R_{ideal}$, is:

$$R_{ideal}(S_{input}) = (S_{input} - S_{low}) \cdot \frac{(R_{ideal,high} - R_{ideal,low})}{(S_{high} - S_{low})} + R_{ideal,low}$$

where, $$R_{ideal,low} = \frac{\sum_{i=1}^{n} R_i(S_{low})}{n}$$

and $$R_{ideal,high} = \frac{\sum_{i=1}^{n} R_i(S_{high})}{n}$$

The level of each RF signal receiving element's 202 responsivity may be adjusted such that the responsivity of the $i_{th}$ RF signal receiving element 202 as a function of a signal input at the midpoint between $S_{low}$ and $S_{high}$ is the same as an ideal curve. An equation for the measured responsivity for the $i_{th}$ RF signal receiving element 202 is:

$$R_i(S_{input}) = (S_{input} - S_{low}) \cdot \frac{(R_{i,high} - R_{i,low})}{(S_{high} - S_{low})} + R_{i,low}$$

where the level-adjusted responsivity equation of the $i_{th}$ RF signal receiving element 202 as a function of a signal input is:

$$R'_i(S_{input}) = (S_{input} - S_{low}) \cdot \frac{(R_{i,high} - R_{i,low})}{(S_{high} - S_{low})} + R_{i,low} + [R_{ideal}(S_{mid}) - R_i(S_{mid})]$$

where a signal midpoint is:

$$S_{mid} = \frac{(S_{high} - S_{low})}{2}$$

The slope of an ideal responsivity curve and a slope of the $i_{th}$ RF signal receiving element 202 responsivity curve will most likely differ. The difference in slope is referred to as a difference in gain. Given this likely difference between the gain of the ideal curve and the gain of a level-adjusted curve, the gain-adjusted and level-adjusted responsivity equation of the $i_{th}$ RF signal receiving element 202 as a function of a signal input is:

$$R_i''(S_{input}) = (S_{input} - S_{low}) \cdot \frac{(R_{i,high} - R_{i,low})}{(S_{high} - S_{low})} +$$
$$R_{i,low} + [R_{ideal}(S_{mid}) - R_i(S_{mid})] + [R_{ideal}(S_{input}) - R_i'(S_{input})]$$

As mentioned above, since the gain and level of the RF signal receiving elements 202 will vary over sub-bands, temperature, and input RF signal, it is prudent to calibrate the RF signal receiving elements 202 during factory acceptance testing and perhaps while operational in the field. If the calibration and adjustments are done during factory acceptance testing, the calibration could use special test equipment (STE) such as calibrated speakers that uniformly bathes each RF signal receiving element 202 with a given input RF signal, $S_{input}$. If it is determined that a calibration is needed to improve operational performance, then an integrated calibration speaker that bathes each dipole antenna element in a pre-determined input RF signal may be used for calibration.

Figures 9A, 9B:
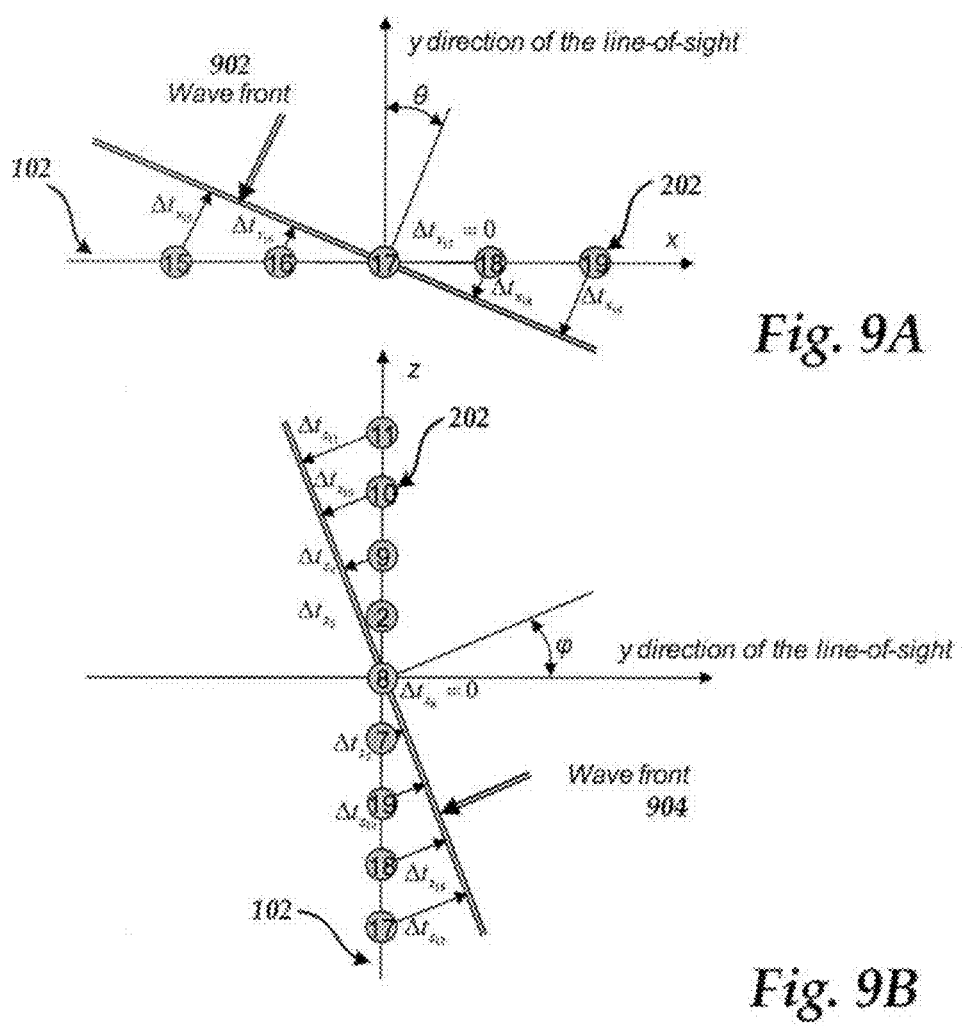
FIG. 9A is a diagram illustrating a first RF wave front impingement on the phased array of the beam-scanning system at an azimuth angle, θ, in accordance with some embodiments.
FIG. 9B is a diagram illustrating a first RF wave front impingement on the phased array of the beam-scanning system at an elevation angle, ϕ, in accordance with some embodiments.

Referring now to FIG. 9A, a diagram illustrating an RF wave front 902 impinging on the phased array 102 of the beam-scanning system at an azimuth angle, θ, is now illustrated. An implementation of beam-forming in the beam-scanning system, calculates a time-delay used for each of the $i_{th}$ RF signal receive elements 202 of the phased array 102 when processing an RF signal received from an object of interest. When the azimuth angle is zero for an orientation of the phased array 102, a wave front 902 of an RF signal from an object of interest impinges on each of the RF signal receiving elements 202 simultaneously.

Referring now to FIG. 9B, a diagram illustrating an RF wave front 904 impinging on the phased array 102 of the beam-scanning system at an elevation angle, φ, is now illustrated. When the azimuth and/or elevation angles are non-zero, a time-delay occurs between the time that each RF signal receiving element 202 receives a wave front 904 emitted from the RF signal of the object of interest traveling at a velocity (v) due to a difference in distance (d) between each signal receiving element 202. For an x azimuth component, a phase portion is:

$$\Theta_{x_i}(\theta,\varphi) = k_c \cdot x_i d_x \cdot [\sin(\theta) \cdot \cos(\varphi) - \sin(\Delta\theta) \cdot \cos(\Delta\varphi)]$$

where $$k_c = \frac{2 \cdot \pi}{\lambda_c} = \frac{2 \cdot \pi \cdot f_c}{v_s}$$

and where $$\Theta_{x_i}(\theta, \varphi) = \frac{2 \cdot \pi \cdot f_c}{v_s} \cdot x_i \cdot d_x \cdot [\sin(\theta) \cdot \cos(\varphi) - \sin(\Delta\theta) \cdot \cos(\Delta\varphi)]$$

and the time delay with respect to the origin for the $i_{th}$ RF signal receiving element 202 in the x direction for a given Δθ and Δφ is:

$$\Delta t_{x_i}(\Delta\theta, \Delta\varphi) = \frac{-x_i \cdot d_x \cdot \sin(\Delta\theta) \cdot \cos(\Delta\varphi)}{v_s}$$

Similarly for the z elevation component, a phase portion is:

$$\Theta_{z_i}(\theta, \varphi) = \frac{2 \cdot \pi \cdot f_c}{v_s} \cdot z_i \cdot d_z \cdot [\sin(\varphi) - \sin(\Delta\varphi)]$$

and a time delay with respect to the origin for the $i_{th}$ RF signal receiving element 202 in the z direction for a given Δφ is:

$$\Delta t_{z_i}(\Delta\varphi) = \frac{-z_i \cdot d_z \cdot \sin(\Delta\varphi)}{v_s}$$

Each time a beam is moved in azimuth and elevation, the time delays should be reset. The receive beam is formed in the desired azimuth and elevation angle direction using equation:

$$B(\Delta\theta, \Delta\varphi) =$$
$$\sum_{i=1}^{n} R_i(\Delta t_{x_i} - \min\{\Delta t_{x_1}, \Delta t_{x_2} \ldots \Delta t_{x_n}\}) \cdot R_i(\Delta t_{z_i} - \min\{\Delta t_{z_1}, \Delta t_{z_2} \ldots \Delta t_{z_n}\})$$

Figure 10A:
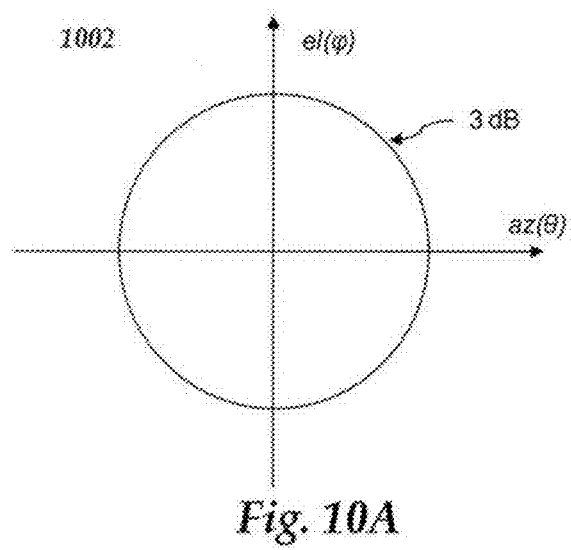
FIG. 10A is a diagram illustrating a beam used by the beam-scanning system to detect, locate and track objects of interest, in accordance with some embodiments.

FIG. 10A illustrates a diagram of a beam 1002 formed from a received RF signal from an object of interest and used by the beam-scanning system. Detection of received RF signals from one or more signal receiving elements 202 (not shown) may be used to form a single beam 1002. The beam 1002 may be formed and centered at the origin of the azimuth and elevation axes. An object of interest may be detected using a single RF signal receiving element 202 or a combination of RF signal receiving elements 202. Each RF signal receiving element 202 dwells on an entire field-of-regard (FOR). An effective detection area for a single RF signal receive element 202 is between −60° and +60° in azimuth and elevation angles as shown in FIG. 5, where the single RF signal receiving element 202 responsivity is greater than half-peak power (−3 dB).

Figure 10B:
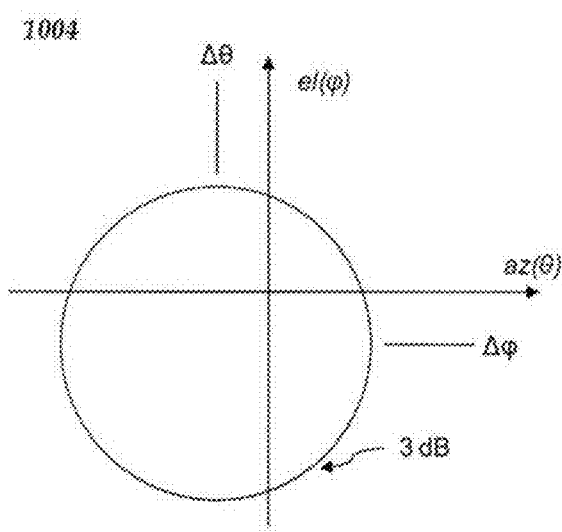
FIG. 10B is a diagram illustrating a beam, offset in azimuth angle, Δθ, and elevation angle, Δϕ, from the line-of-site, used by the beam-scanning system to detect, locate and track objects of interest, in accordance with some embodiments.

FIG. 10B illustrates a diagram of a receive beam 1004 formed by the beam-scanning system in order to receive an RF signal from an object of interest. The receive beam 1004 may be moved in azimuth and elevation angles by changing Δθ and Δφ in relation to the beam-scanning system line-of-site, which is the y-axis shown in FIG. 4, in order to detect a signal coming from an object of interest which is off-axis from the beam-scanning system line-of-site.

Figure 11A:
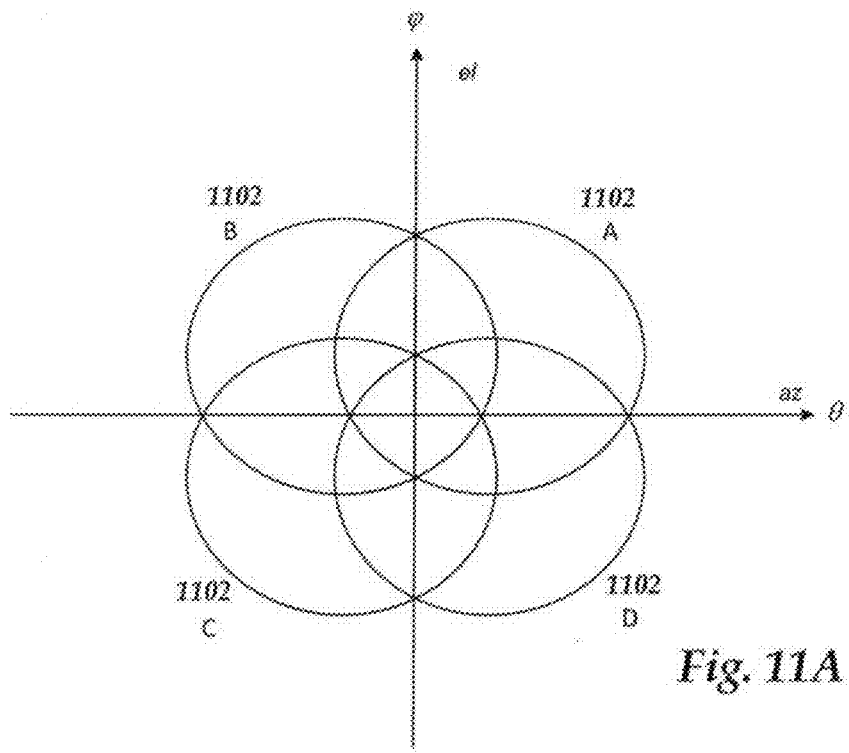
FIG. 11A is a diagram illustrating multiple beams used by the beam-scanning system to detect, locate and track objects of interest, in accordance with some embodiments.
Figure 11B:
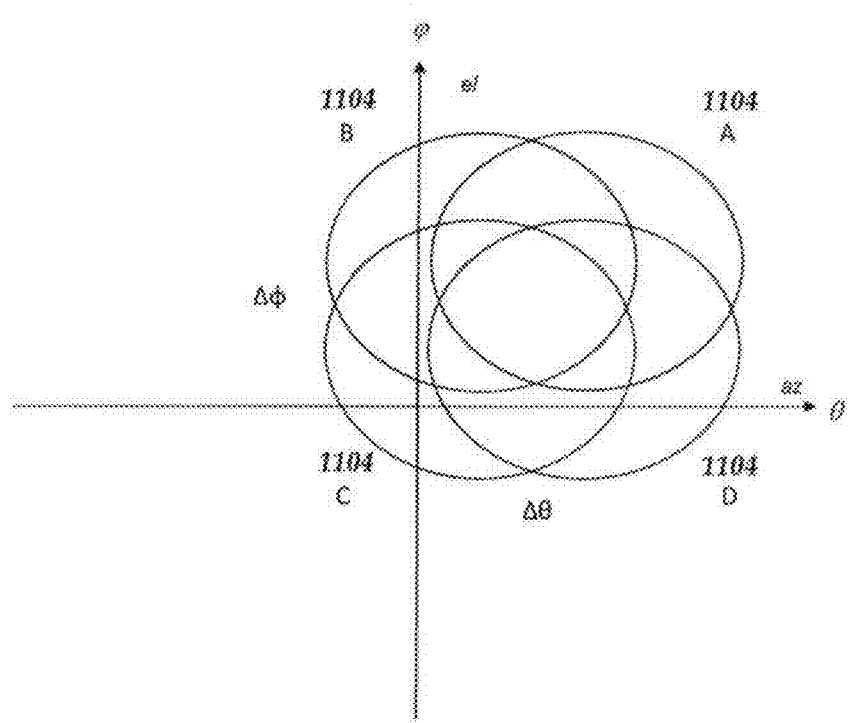
FIG. 11B is a diagram illustrating multiple beams, offset in azimuth angle and elevation angle from the line-of-site, used by the beam-scanning system to detect, locate and track objects of interest, in accordance with some embodiments.

FIG. 11A illustrates a diagram of multiple beams 1102 used by the beam-scanning system to detect an object of interest. Multiple beams such as $1102_A$, $1102_B$, $1102_C$, and $1102_D$ may be formed in a pattern centered about the origin. The multiple beams 1102 may be clustered more tightly or loosely, but an overlap area of the multiple beams 1102 for detecting the object of interest would be decreased or increased. FIG. 11B also illustrates a diagram of multiple beams 1104 used by the beam-scanning system to detect an object of interest. Multiple beams such as $1104_A$, $1104_B$, $1104_C$, and $1104_D$ may be formed in a pattern rotated by Δθ and Δφ from the beam-scanning system line-of-site y-axis as shown in FIG. 4, in order to detect a signal coming from an object of interest which is off-axis from the beam-scanning system line-of-site.

Figure 12A:
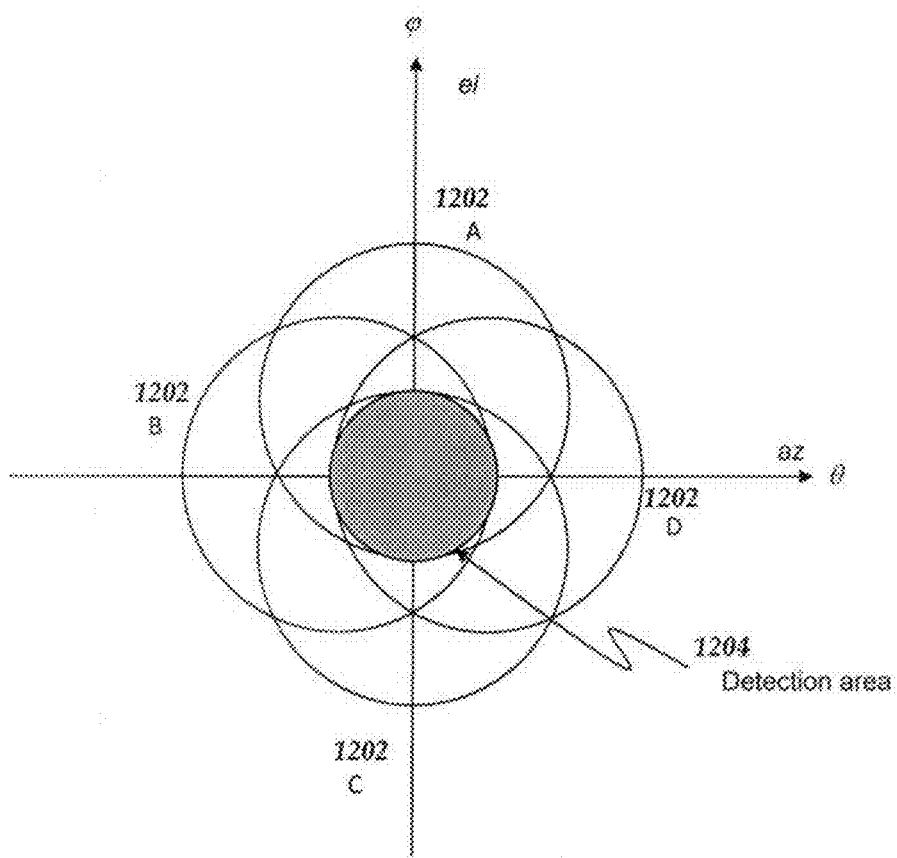
FIG. 12A is a diagram illustrating a multiple beam arrangement for the beam-scanning system for detecting an object of interest, in accordance with some embodiments.

FIG. 12A illustrates a diagram of an exemplary multiple beam arrangement for the beam-scanning system for detecting an object of interest. When using multiple beams 1202 to detect objects of interest, an area where the greatest detection accuracy will occur is where the multiple beams 1202 overlap at detection area 1204. During signal processing, the DSP 106 (not shown) receives signals from each of the multiple beams, 1202$_A$, 1202$_B$, 1202$_C$, and 1202$_D$. The signal strength at the detection area 1204 is higher than the signal strength outside the detection area 1204 because each received signal from the multiple beams, 1202$_A$, 1202$_B$, 1202$_C$, and 1202$_D$ is greater than −3 dB from the maximum beam-responsivity.

Once an object of interest is detected to be within the detection area 1204 of a particular search pattern, a more exact location in azimuth and elevation angles of the object of interest may be desired. The search pattern may then be shifted such that the detection area 1204 is centered more exactly about the object of interest. Centering the object of interest may occur when the responsivity of the multiple beams, 1202$_A$, 1202$_B$, 1202$_C$, and 1202$_D$ are equal to each other in relation to a signal strength emitted from the object of interest. By centering the detection area on the object of interest, the azimuth and elevation angles of the object of interest may be more accurately determined. Accordingly, the location and direction of the object of interest may be more accurately determined.

Figure 12B:
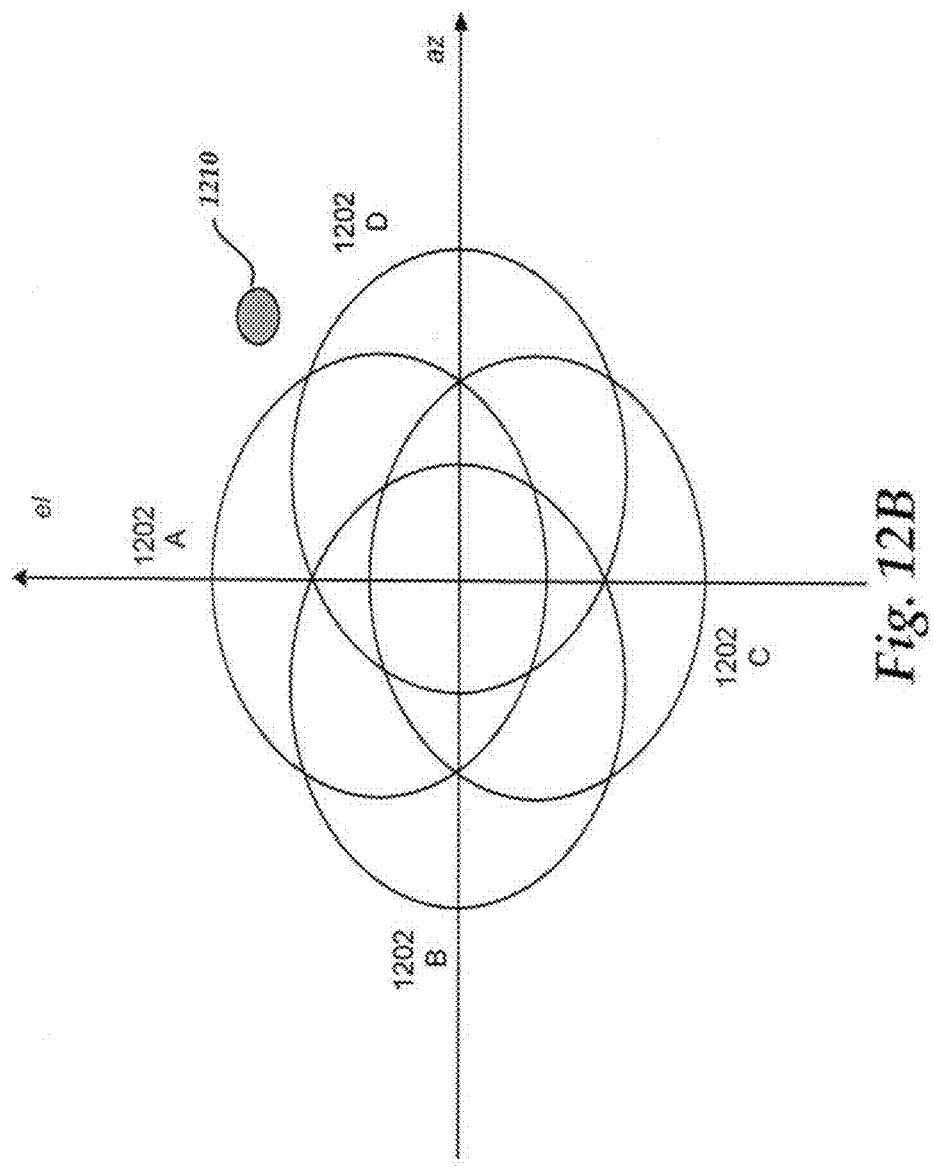
FIG. 12B is a diagram illustrating a 4-beam arrangement utilizing a scan pattern to detect an object of interest, in accordance with some embodiments.

For mathematical simplicity, a 4-beam arrangement as shown in FIG. 12A for the beam-scanning system will be described to discuss algorithms used by the beam-scanning system for detecting an object of interest. FIG. 12B illustrates a 4-beam arrangement and an object 1210, which represents an object of interest that is emitting an RF signal. In this exemplary case the receive signal in any one of the 4 beams is less than a detection threshold.

Figure 12C:
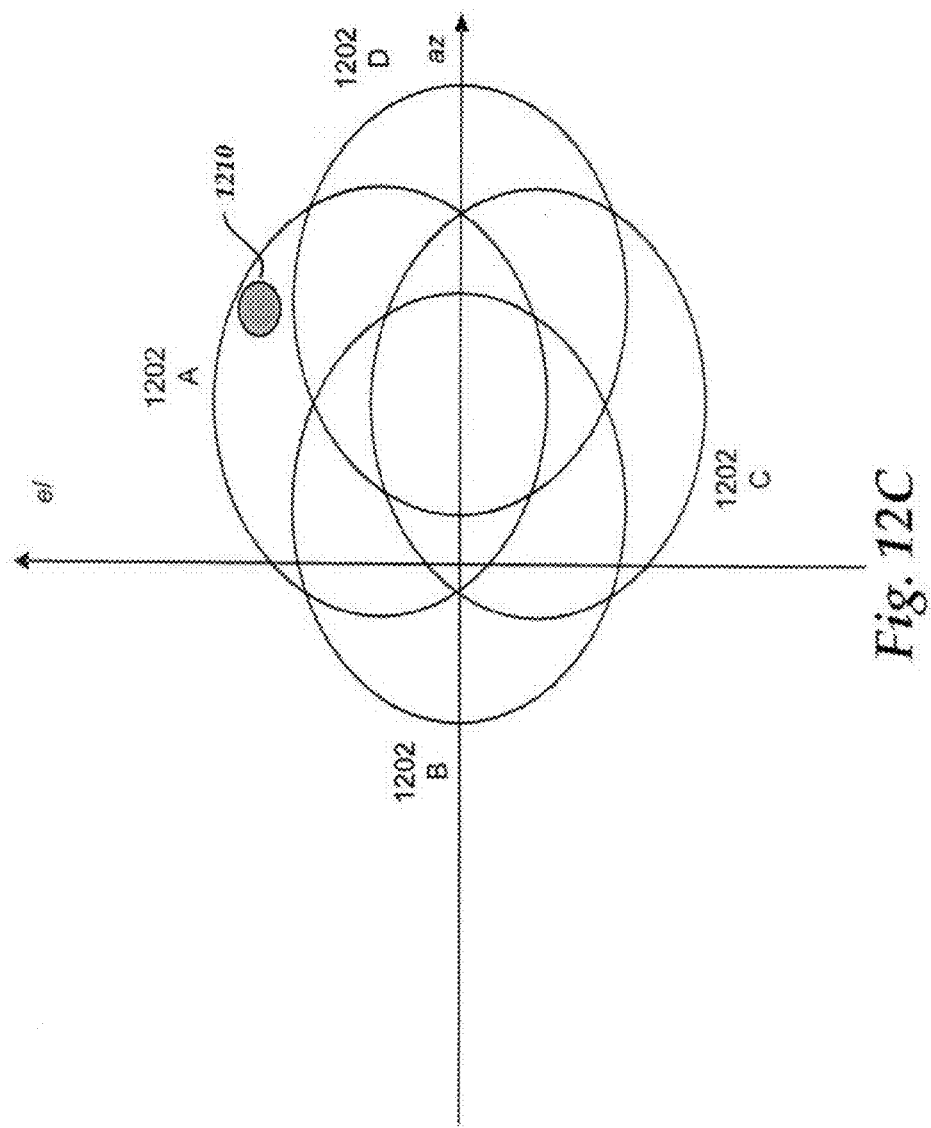
FIG. 12C is a diagram illustrating a 4-beam arrangement utilizing a scan pattern to detect an object of interest, in accordance with some embodiments.
Figure 12D:
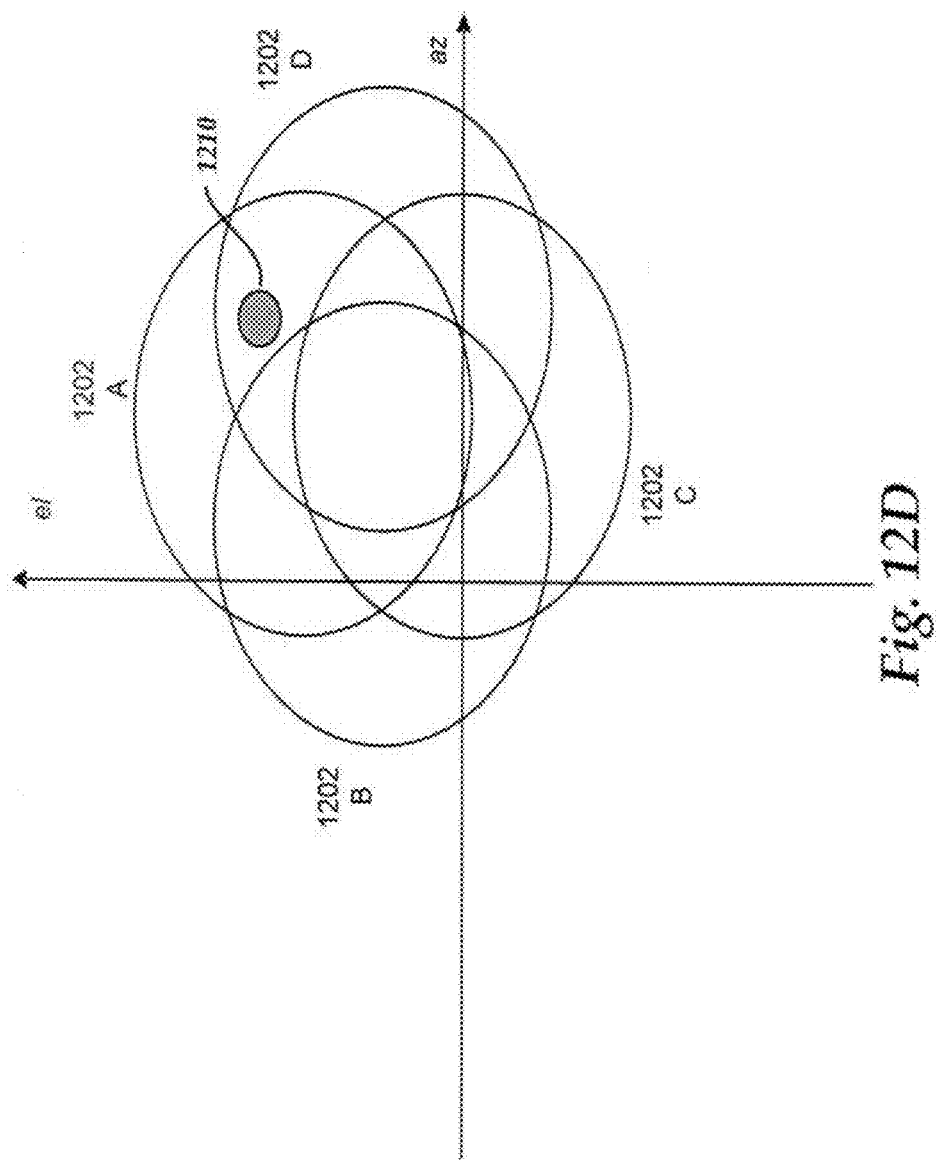
FIG. 12D is a diagram illustrating a 4-beam arrangement utilizing a scan pattern to detect an object of interest, in accordance with some embodiments.
Figure 15:
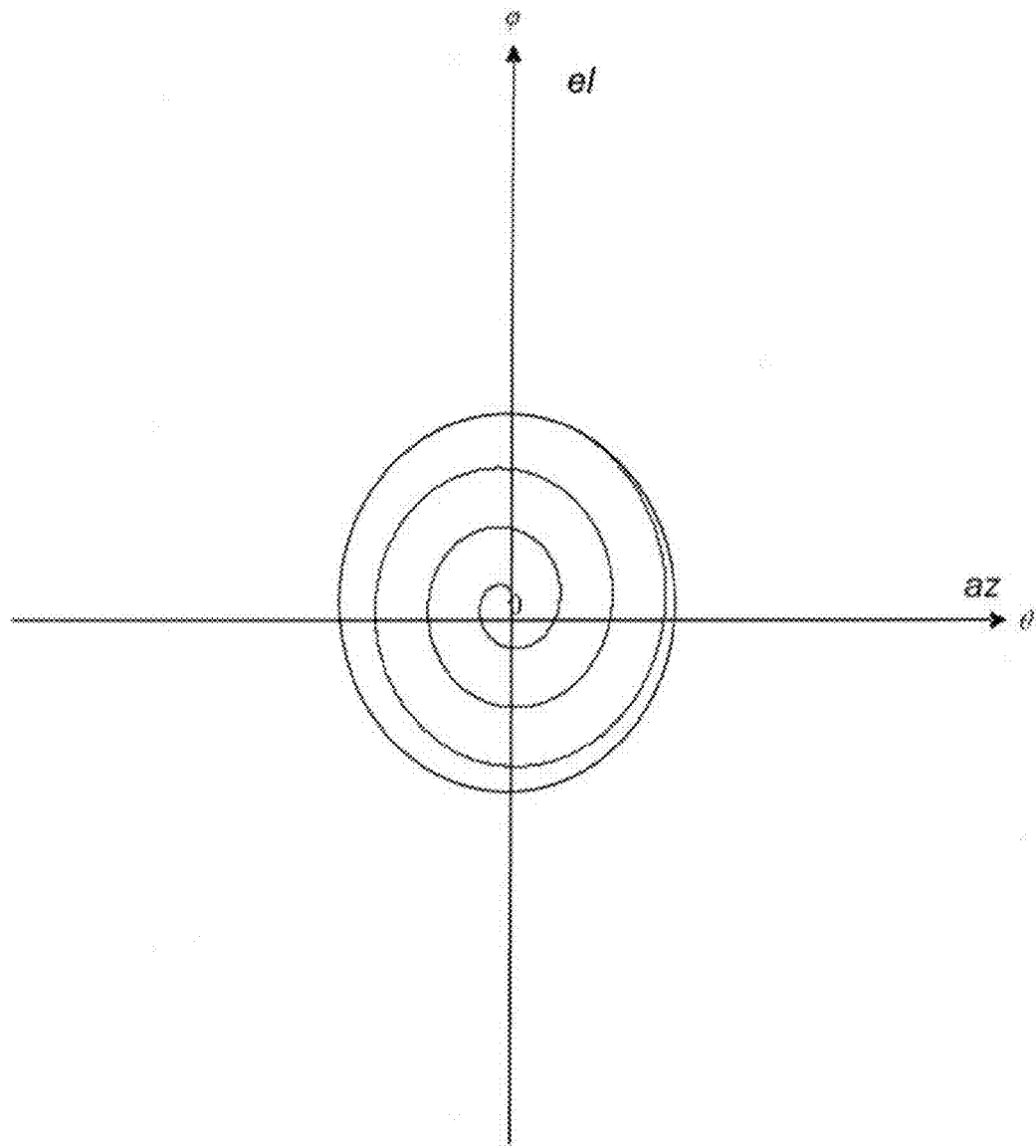
FIG. 15 is a graph illustrating a search pattern for detecting, locating, listening to and tracking an object of interest, in accordance with some embodiments.

The 4-beam arrangement illustrated in FIG. 12C has been further scanned in a pattern such as the scan pattern illustrated in FIG. 15 (discussed below), such that the receive signal in beam A 1202 exceeds the detection threshold. Once the object 1210 is detected by at least one of the beams, then the beam-scanning system invokes a beam-scanning system algorithm to rotate the 4-beam arrangement in azimuth and elevation such that the receive signal in each of the 4 beams exceed a −3 dB detection threshold. In an exemplary case, if an object of interest is detected with beam A 1202 as in FIG. 12C then the beam-scanning system algorithm may command the 4-beam arrangement to rotate in positive elevation until the object of interest is detected in one or more of the other beams. In this exemplary case, the object 1210 is detected by both beam A 1202 and beam D 1202 as shown in FIG. 12D. The algorithm may subsequently command the 4-beam arrangement to continue to rotate in positive elevation until the object 1210 is also detected by beam C 1202 as shown in FIG. 12E. Finally, the algorithm may command the 4-beam arrangement to rotate in positive azimuth until all four beams detect the object 1210 as shown in FIG. 12F.

Figure 12F:
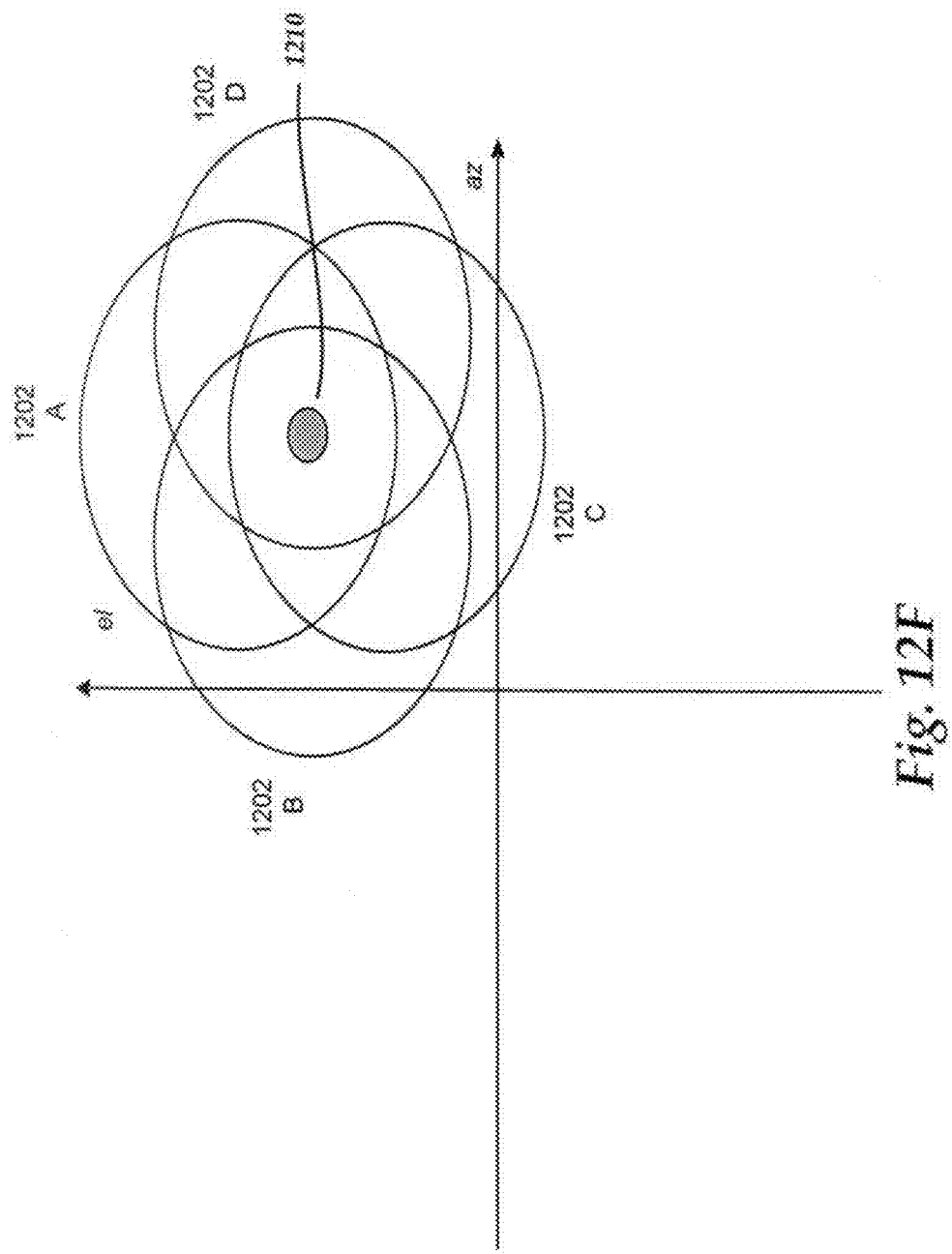
FIG. 12F is a diagram illustrating a 4-beam arrangement utilizing a scan pattern to detect an object of interest, in accordance with some embodiments.
Figure 13:
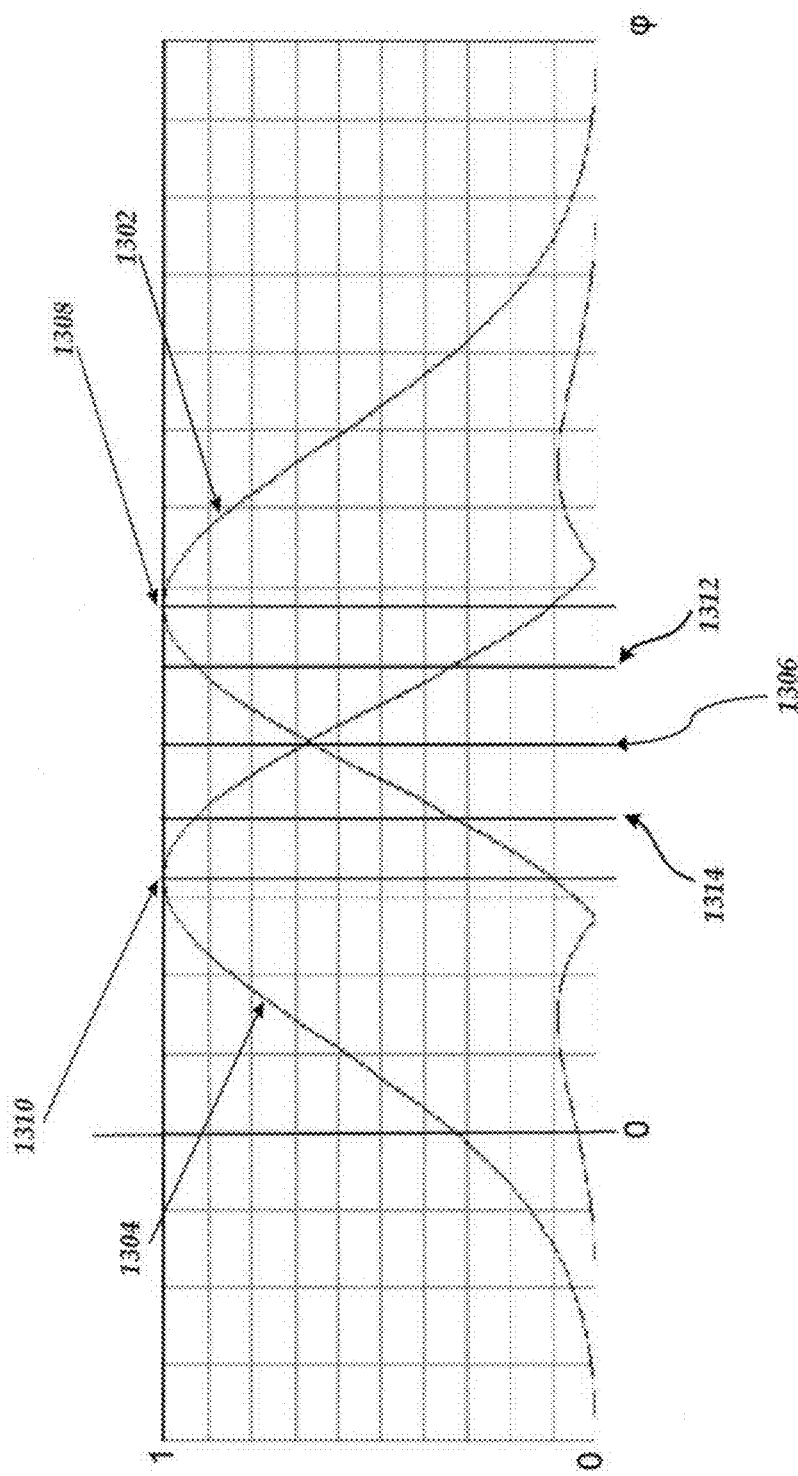
FIG. 13 is a graph illustrating a 2-beam pattern scan, normalized to 1, used to establish an elevation location for an object of interest, in accordance with some embodiments.

With the object 1210 located by the 4-beam arrangement as shown in FIG. 12F, the beam-scanning system algorithm finds the object 1210 location in elevation, $\varphi_{calculated}$, with respect to the line of site of the beam-scanning system, i.e. the origin as shown in FIG. 13 using the following equations:

$$\varphi_{calculated} = \left[ \frac{\frac{[B_{A\_measured} - B_{C\_measured}]}{[B_{A\_measured} + B_{C\_measured}]}}{\left[\frac{[B_A(0, \varphi_{top}) - B_C(0, \varphi_{top})]}{[B_A(0, \varphi_{top}) + B_C(0, \varphi_{top})]} - \frac{[B_A(0, \varphi_{bottom}) - B_C(0, \varphi_{bottom})]}{[B_A(0, \varphi_{bottom}) + B_C(0, \varphi_{bottom})]}\right]} \right] \cdot$$

$$[\varphi_{top} - \varphi_{bottom}] + \varphi_{center}$$

where $B_{A\_measured}$ is the output for beam A 1302, and $B_{C\_measured}$ is the output for beam C 1304, where $$\varphi_{center} = \frac{(\Delta\varphi_A + \Delta\varphi_C)}{2}$$

is the center 1306 between $\Delta\phi_A$ the center 1308 of Beam A 1302, and $\Delta\phi_C$ the center 1310 of Beam C 1304, where $\phi_{top}$ 1312 is $$\phi_{top} = [\phi_{center} + \Delta\phi_{top}] \leq \Delta\phi_A$$

and $\phi_{bottom}$ 1314 is $$\phi_{bottom} = [\phi_{center} - \Delta\phi_{bottom}] \geq \Delta\phi_C$$

are points equidistant such that from the center between the center 1308 of Beam A 1302 and the center 1310 of Beam C 1304, and where $\Delta\phi_{top}$ is an angular distance in elevation from the center 1306 $\phi_{center}$, and where $\Delta\phi_{bottom}$ is an angular distance in elevation from the center $\phi_{center}$ as shown in FIG. 13, assuming that $\Delta\phi_{top}$ is equal to $\Delta\phi_{bottom}$.

Figure 14:
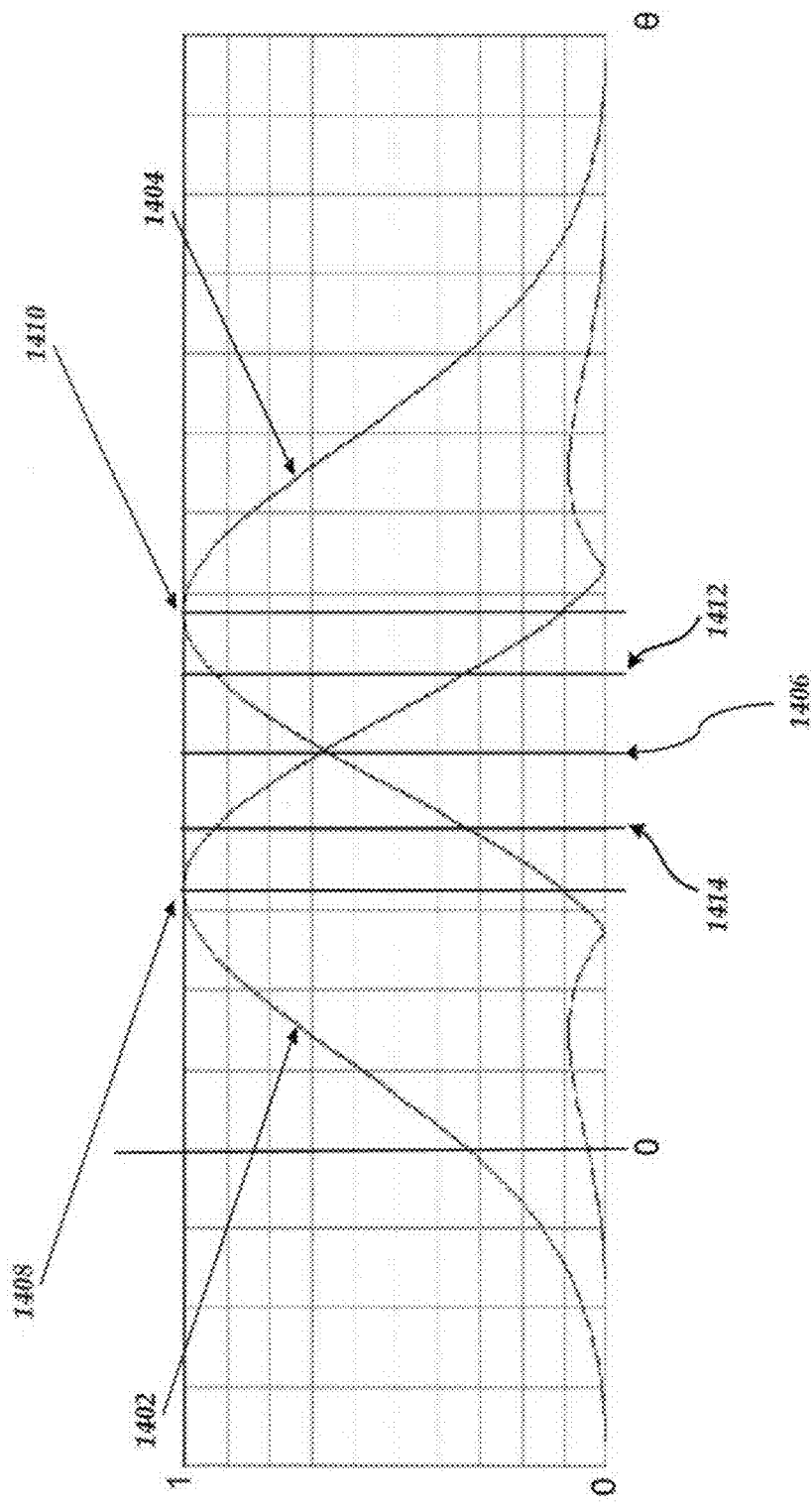
FIG. 14 is a graph illustrating a 2-beam pattern scan, normalized to 1, used to establish an azimuth location for an object of interest, in accordance with some embodiments.

With the object 1210 located in the 4-beam pattern as shown in FIG. 12F, the algorithm to find a location in azimuth, $\theta_{calculated}$, with respect to the line of site of the beam-scanning system, i.e. the origin as shown in FIG. 14 using the following equations:

$$\theta_{calculated} = \left[ \frac{\frac{[B_{D\_measured} - B_{B\_measured}]}{[B_{D\_measured} + B_{B\_measured}]}}{\left[\frac{[B_D(\theta_{right}, 0) - B_B(\theta_{right}, 0)]}{[B_D(\theta_{right}, 0) + B_B(\theta_{right}, 0)]} - \frac{[B_D(\theta_{left}, 0) - B_B(\theta_{left}, 0)]}{[B_D(\theta_{left}, 0) + B_B(\theta_{left}, 0)]}\right]} \right] \cdot$$

$$[\theta_{right} - \theta_{left}] + \theta_{center}$$

where $B_{B\_measured}$ is the measured output for beam B 1402, and $B_{D\_measured}$ is the measured output for beam D 1404, where $$\theta_{center} = \frac{(\Delta\theta_D + \Delta\theta_B)}{2}$$

is the center 1406 between $\Delta\theta_B$ the center 1408 of beam B 1402, and $\Delta\theta_D$ the center 1410 of beam D 1404, where $\phi_{right}$ 1412 is $$\theta_{right} = [\theta_{center} + \Delta\theta_{right}] \leq \Delta\theta_D$$

and $\phi_{left}$ 1414 is $$\theta_{left} = [\theta_{center} - \Delta\theta_{left}] \geq \Delta\theta_B$$

are points equidistant such that from the center between the center 1408 of Beam B 1402 and the center 1410 of Beam D 1404, where $\Delta\theta_{right}$ is an angular distance in azimuth from the center 1406 $\theta_{center}$, and where $\Delta\theta_{left}$ is an angular distance in azimuth from the center $\theta_{center}$ as shown in FIG. 14, assuming that $\Delta\theta_{right}$ is equal to $\Delta\theta_{left}$.

Even more beams may be added to increase object detection accuracy. Other beam patterns may be used to locate an object of interest in a FOR. Whatever the beam pattern being implemented, the beam-scanning system 100 may scan a FOR in a pre-determined search scan, for example, a spiral search pattern as illustrated in FIG. 15 or a raster scan pattern. Detection accuracy may also be increased if an RF signal detection threshold is set for the beam-scanning system 100. For example, the DSP 106 may transmit detection data to the external entity 108 if all or a majority of the beams in the search pattern detect an RF signal above a threshold value, such as greater than or equal to $B_{3\text{-}dB}$.

Figure 16:
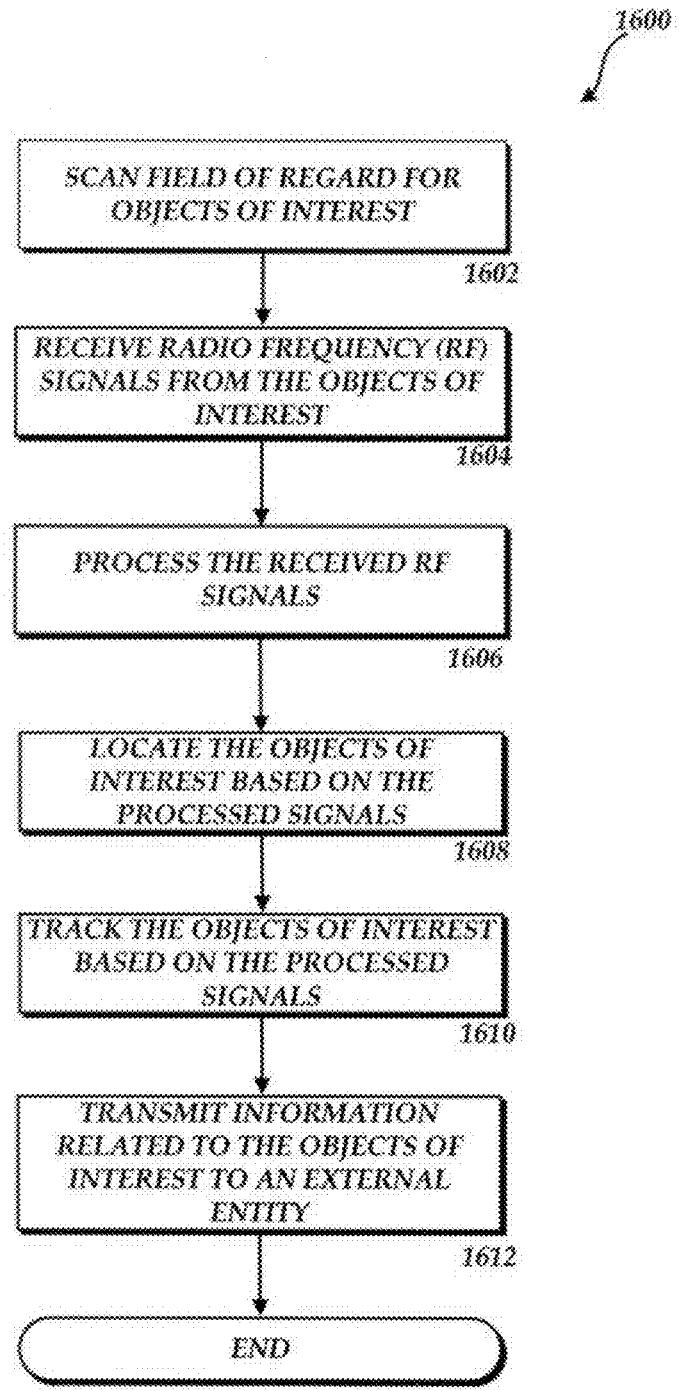
FIG. 16 is a flow diagram showing aspects of one illustrative process disclosed herein for locating and tracking objects of interest, in accordance with some embodiments.

FIG. 16 is a flow diagram showing a routine 1600 that illustrates aspects of one illustrative process disclosed herein for locating and tracking objects of interest. It should also be appreciated that more or fewer operations may be performed than shown in the figures and described herein. These operations may also be performed in a different order than those described herein.

The routine 1600 begins at operation 1602, where a beam-scanning system 100 (not shown) scans a FOR. The FOR may be scanned using a variety of search patterns. For example, the beam-scanning system 100 may search a battlefield in a spiral, raster or any other viable pattern for locating one or more objects of interest. The routine 1600 proceeds to operation 1604 where the beam-scanning system 100 receives signals emitted from the one or more objects of interest through a phased array 102 (not shown). The received signals may be an RF signal. The routine 1600 proceeds to operation 1606 where the beam-scanning system 100 processes the received signals to determine a location and direction of the one or more objects of interest. The beam-scanning system 100 uses the DSP 106 (not shown) to process the received signal, which is amplified prior to processing by the DSP 106. The DSP 106 may form one or more beams from the received signals during signal processing. At operation 1608, the beam-scanning system 100 determines a location and direction of the one or more objects of interest based on the processed signal from the DSP 106. Upon determining the location and direction of the one or more objects of interest, at operation 1610, the beam-scanning system 100 tracks the one or more objects of interest. At operation 1612, the beam-scanning system 100 transmits any location and tracking information generated by the DSP 106 to the external entity 108 (not shown) for further processing and review. The external entity may subsequently use the received information for operations and logistics for the one or more objects of interest.

Figure 17:
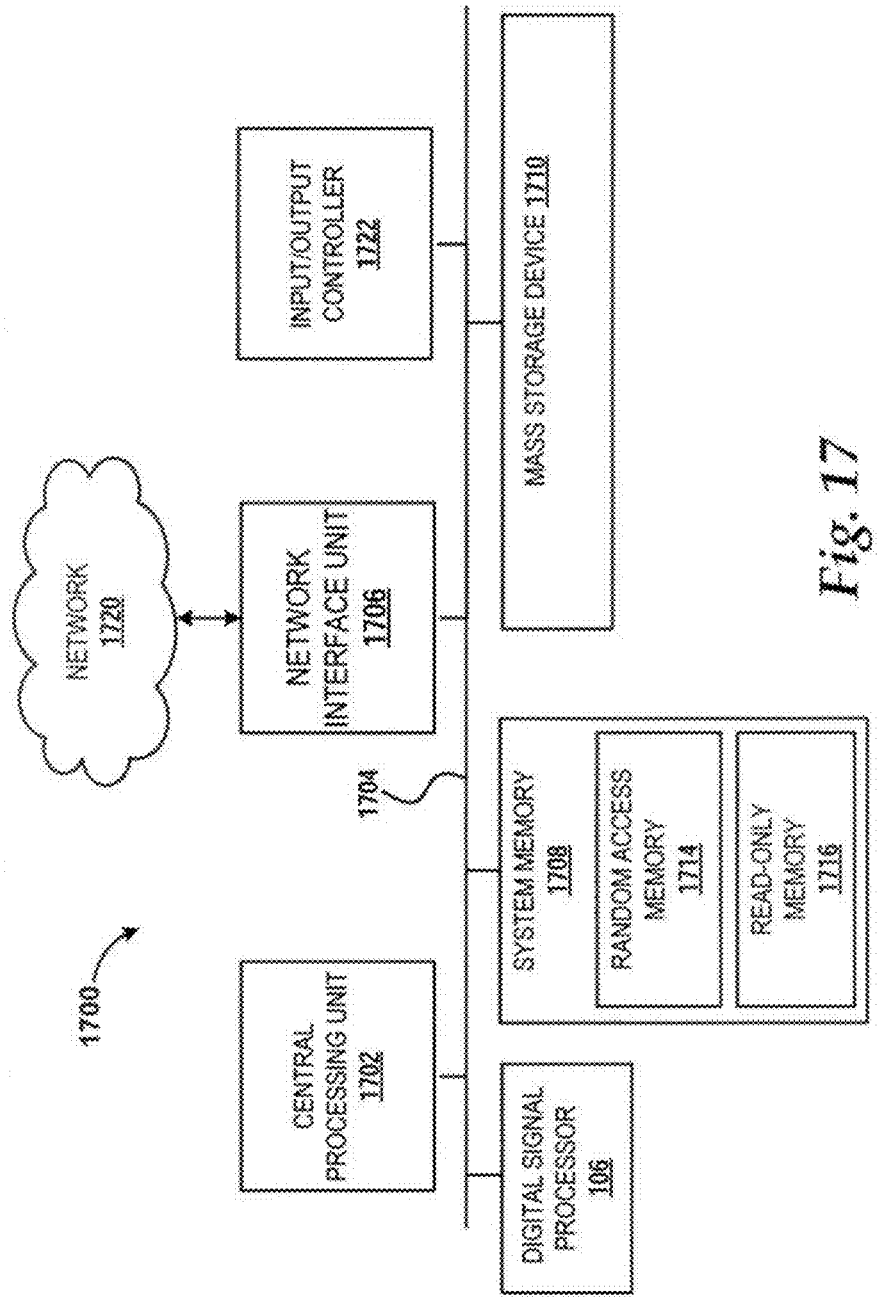
FIG. 17 is a computer architecture diagram showing an illustrative computer hardware architecture for a computing system capable of implementing aspects of the embodiments presented herein.

FIG. 17 shows an illustrative computer architecture 1700 capable of executing the software components described herein for locating and tracking objects of interest in the manner presented above. The computer architecture 1700 includes a central processing unit 1702 (CPU), a digital signal processor (DSP) 106, a system memory 1708, including a random access memory 1714 (RAM) and a read-only memory 1716 (ROM), and a system bus 1704 that couples the memory to the CPU 1702. In one embodiment, the CPU 1702 and the DSP 106 may be a single processor. The CPU 1702 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 1700 also includes a mass storage device 1710 for storing an operating system as well as data processed by the DSP 106, search pattern data and other various data related to use of the beam-scanning system 100 as described above in regard to FIGS. 1-16. The mass storage device 1710 is connected to the CPU 1702 and DSP 106 through a mass storage controller (not shown) connected to the bus 1704. The mass storage device 1710 and its associated computer-readable media provide non-volatile storage for the computer architecture 1700. The computer architecture 1700 may store data on the mass storage device 1710 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1710 is characterized as primary or secondary storage, and the like. For example, the computer architecture 1700 may store information to the mass storage device 1710 by issuing instructions through the storage controller to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture 1700 may further read information from the mass storage device 1710 by detecting the physical states or characteristics of one or more particular locations within the physical storage units.

Although the description of computer-readable media contained herein refers to a mass storage device, such as a hard disk or CD-ROM drive, it should be appreciated by those skilled in the art that computer-readable media can be any available computer storage media that can be accessed by the computer architecture 1700. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 1700.

According to various embodiments, the computer architecture 1700 may operate in a networked environment using logical connections to remote computers through a network, such as the network 1720. The computer architecture 1700 may connect to the network 1720 through a network interface unit 1706 connected to the bus 1704. It should be appreciated that the network interface unit 1706 may also be utilized to connect to other types of networks and remote computer systems. The computer architecture 1700 may also include an input-output controller 1722 for receiving and processing input from a number of other devices.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for locating and tracking one or more objects of interest, comprising:
   scanning a field of regard (FOR) with a multiple-beam pattern using one of a spiral search pattern and a raster scan pattern for the one or more objects of interest simultaneously;
   receiving signals emitted from the one or more objects of interest;
   processing the received signals to determine a time delay between two signal receiving elements of a wave front emitted from at least one object of interest; and
   determining the location and direction from the at least one object of interest based on determining the time delay between the two signal elements of the wave front of the processed signals.

2. The computer-implemented method of claim 1, wherein the received signals are collected using a phased array.

3. The computer-implemented method of claim 2, wherein the phased array is comprised of n receiving elements configured in a hexagonal pattern, where n receiving elements are equal in number to [1+6(0.5 m(m−1))], m being equal to or greater than 2.

4. The computer-implemented method of claim 3, further comprising calibrating the one or more signal receiving elements.

5. The computer-implemented method of claim 3, wherein the one or more signal receiving elements are arranged in a hexagonal pattern.

6. The computer-implemented method of claim 1, further comprising tracking the one or more objects of interest based on the processed signals.

7. The computer-implemented method of claim 1, wherein the received signals are radio frequency (RF) signals.

8. The computer-implemented method of claim 1, further comprising forming one or more beams from the received signals.

9. The computer-implemented method of claim 8, wherein a detection area is formed using the one or more beams.

10. A beam-scanning system, comprising:
    a wide-band multi-element Radio Frequency (RF) receive phased array comprising n RF dipole antenna signal receiving elements configured in a hexagonal pattern, where n receiving elements are equal in number to [1+6 (0.5 m(m−1))], m being equal to or greater than 2, the wide-band multi-element RF receive phased array to receive signals emitted from one or more objects of interest within a field of regard (FOR);
    one or more low noise amplifiers to amplify the received signals;
    a digital signal processor (DSP) to process the amplified received signals and calculate a location and a direction of the one more objects of interest based on the amplified received signals being processed to determine a time delay between two signal receiving elements of the RF dipole antenna of a wave front emitted from the one or more objects of interest received at corresponding receiving elements.

11. The beam-scanning system of claim 10 further comprising an external entity for directing operations associated with the one or more objects of interest based on the processed signals.

12. The beam-scanning system of claim 10, wherein the DSP creates one or more beams based on the received signals.

13. The beam-scanning system of claim 12, wherein the one or more beams are used to create a detection area for determining a location and direction for the one or more objects of interest and tracking the one or more objects of interest.

14. The beam-scanning system of claim 13, wherein the one or more beams are used to search the FOR in a predetermined search pattern.

15. A non-transitory computer-readable storage medium having computer-executable instructions stored thereupon which, when executed by a computer, cause the computer to:
    scan a field of regard with a multiple-beam pattern using one of a spiral search pattern and a raster scan pattern for one or more objects of interest using a phased array simultaneously;
    receive radio frequency (RF) signals emitted from the one or more objects of interest;
    process the RF signals to determine a time delay between two signal receiving elements of a wave front emitted from at least one object of interest;
    determine the location and direction of the one or more objects of interest based on the processed RF signals; and
    track the one or more objects of interest based on the processed RF signals.

* * * * *